(12) United States Patent
Smith

(10) Patent No.: US 9,073,417 B1
(45) Date of Patent: Jul. 7, 2015

(54) TONNEAU COVER CLAMP

(71) Applicant: Zachariah P Smith, Westland, MI (US)

(72) Inventor: Zachariah P Smith, Westland, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 14/286,164

(22) Filed: May 23, 2014

(51) Int. Cl.
*B60J 7/00* (2006.01)
*B60J 7/10* (2006.01)

(52) U.S. Cl.
CPC ...................... *B60J 7/104* (2013.01)

(58) Field of Classification Search
CPC ........................................... B60J 7/104
USPC ...................... 296/100.16, 100.15
See application file for complete search history.

(56) References Cited

U.S. PATENT DOCUMENTS

| | | | |
|---|---|---|---|
| 5,540,475 A | 7/1996 | Kersting | |
| 5,688,017 A | 11/1997 | Bennett | |
| 5,975,618 A | 11/1999 | Rippberger | |
| 5,984,400 A * | 11/1999 | Miller et al. | 296/100.15 |
| 7,188,888 B2 | 3/2007 | Wheatley et al. | |
| 7,258,387 B2 | 8/2007 | Weldy | |
| 7,334,830 B2 | 2/2008 | Weldy | |
| 7,628,442 B1 | 12/2009 | Spencer et al. | |
| 7,905,536 B2 | 3/2011 | Yue | |
| 8,262,148 B2 | 9/2012 | Rusher et al. | |
| 8,328,267 B2 | 12/2012 | Schmeichel et al. | |
| 2014/0042769 A1 | 2/2014 | Spencer | |

* cited by examiner

*Primary Examiner* — Joseph D Pape
(74) *Attorney, Agent, or Firm* — Ralph E. Smith

(57) ABSTRACT

A tonneau cover clamp is provided for clamping a tonneau cover to a rail of a vehicle. The rail of the vehicle has a downwardly facing flange and an outwardly facing flange. The tonneau cover clamp includes a bracket, a clamp arm, a handle and a clamp member. The bracket is coupled to a transverse frame member of the tonneau cover. The handle and clamp member are collectively rotatably coupled to the clamp arm. The clamp member has an upward cam and a side cam integrally formed thereon. The clamp member is configured to engage the rail upon rotation of the handle such that concurrently (i) the upward cam slidably engages the downwardly facing flange to urge the tonneau cover downwardly and (ii) the side cam slidably engages the outwardly facing flange to urge the tonneau cover outwardly.

18 Claims, 8 Drawing Sheets

TONNEAU COVER CLAMP

FIELD

The present disclosure relates generally to tonneau covers configured for use on cargo beds of motor vehicles and, more particularly, to a tonneau cover clamp configured to clamp a tonneau cover relative to a cargo bed.

BACKGROUND

Motor vehicles such as pickup trucks include a bed for carrying cargo. Tonneau covers are available to cover the cargo bed of a pickup truck. A tonneau cover generally includes a cover, a frame system that supports the cover, and a clamp system that is configured to secure the tonneau cover relative to a rail member configured on the pickup truck bed. While many tonneau cover clamps are useful for their intended purpose, many limitations exist. In some configurations, it is awkward and difficult to manipulate conventional clamp systems between various clamped and unclamped positions. Furthermore, in some instances it is difficult to apply sufficient downward and lateral (outboard or cross-car) tension across the tonneau cover. In addition, it is difficult to secure a tonneau cover in a repeatable fashion using the conventional clamp systems. Thus, while conventional tonneau cover clamp systems work for their intended purpose, there remains a need for improvement in the relevant art.

SUMMARY

In one aspect, a tonneau cover clamp is provided in accordance with the teachings of the present disclosure. The tonneau cover clamp is configured to secure the tonneau cover relative to a rail of a vehicle. The rail of the vehicle has a downwardly facing flange and an outwardly facing flange. In an exemplary implementation, the tonneau cover clamp includes a bracket, a clamp arm, a handle and a clamp member. The bracket is fixedly coupled to a transverse frame member of the tonneau cover. The clamp arm is pivotally coupled to the bracket. The handle and clamp member are collectively rotatably coupled to the clamp arm. The handle and clamp member are collectively rotatable between an intermediate position and a clamped position. The clamp member has an upward cam and a side cam integrally formed thereon. The clamp member is configured to engage the rail upon rotation of the handle such that concurrently (i) the upward cam slidably engages the downwardly facing flange to urge the tonneau cover downwardly and (ii) the side cam slidably engages the outwardly facing flange to urge the tonneau cover outwardly (or in a direction generally toward a perimeter of the cargo bed).

According to additional features, the clamp member and the handle are rotatably mounted to a fastener extending through a passage defined in the clamp arm. The clamp member defines an adjustment slot therein. The clamp member is selectively movable along the adjustment slot relative to a lock arm to change a location of the upward cam in the clamped position.

According to still other features, the handle includes a handle body having a longitudinal axis that is transverse to the downwardly facing flange in the intermediate position. The clamp arm has an upper clamp arm portion, a lower clamp arm portion and an intermediate clamp arm portion. The intermediate clamp arm portion connects the upper and lower clamp arm portions. The upper and lower clamp arm portions define parallel and offset planes. The clamp arm includes a stowed slot and a clamp slot. A pin locates (i) into the stowed slot to fix the clamp arm relative to the bracket in the stowed position and (ii) into the clamp slot to fix the clamp arm relative to the bracket in the stowed position. The stowed slot and the clamp slot are generally transverse relative to each other. The upward cam is arcuately shaped. The side cam is arcuately shaped. The clamp member is formed of injection molded plastic.

In another aspect, a tonneau cover clamp for securing a tonneau cover relative to a rail of a vehicle constructed in accordance to additional features of the present disclosure is provided. The rail of the vehicle includes a downwardly facing flange and an outwardly facing flange. In an exemplary implementation, the tonneau cover clamp comprises a bracket, a clamp arm, a handle and a clamp member. The bracket is coupled to a transverse frame member of the tonneau cover. The clamp arm is rotatably coupled to the bracket between a stowed position and a working position. The handle and the clamp member are rotatable (i) with the clamp arm relative to the bracket from the stowed position to the working position, and rotatable (ii) relative to the clamp arm between an intermediate position and a clamped position. The clamp member has an upward cam and a side cam integrally formed thereon. The clamp member is configured to engage the rail upon rotation of the handle such that concurrently (i) the upward cam slidably engages the downwardly facing flange to urge the tonneau cover downwardly and (ii) the side cam slidably engages the outwardly facing flange to urge the tonneau cover outwardly (or in a direction generally toward a perimeter of the cargo bed).

According to additional features, the clamp member and the handle are rotatably mounted to a fastener extending through a passage defined in the clamp arm. The clamp member defines an adjustment slot therein. The clamp member is selectively movable along the adjustment slot relative to a lock arm to change a location of the upward cam in the clamped position.

According to additional features, the handle includes a handle body having a longitudinal axis that is transverse to the downwardly facing flange in the intermediate position. The longitudinal axis of the handle body is parallel to the downwardly facing flange in the clamped position. The clamp arm has an upper clamp arm portion, a lower clamp arm portion and an intermediate clamp arm portion. The intermediate clamp arm portion connects the upper and lower clamp arm portions. The upper and lower clamp arms define parallel and offset planes.

According to still other features, the clamp arm includes a stowed slot and a clamp slot. The pin locates (i) into the stowed slot to fix the clamp arm relative to the bracket in the stowed position and (ii) into the clamp slot to fix the clamp arm relative to the bracket in the working position. The stowed slot and the clamp slot are generally transverse relative to each other. The clamp member is formed of plastic. The upward cam is arcuately shaped. The side cam is arcuately shaped.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
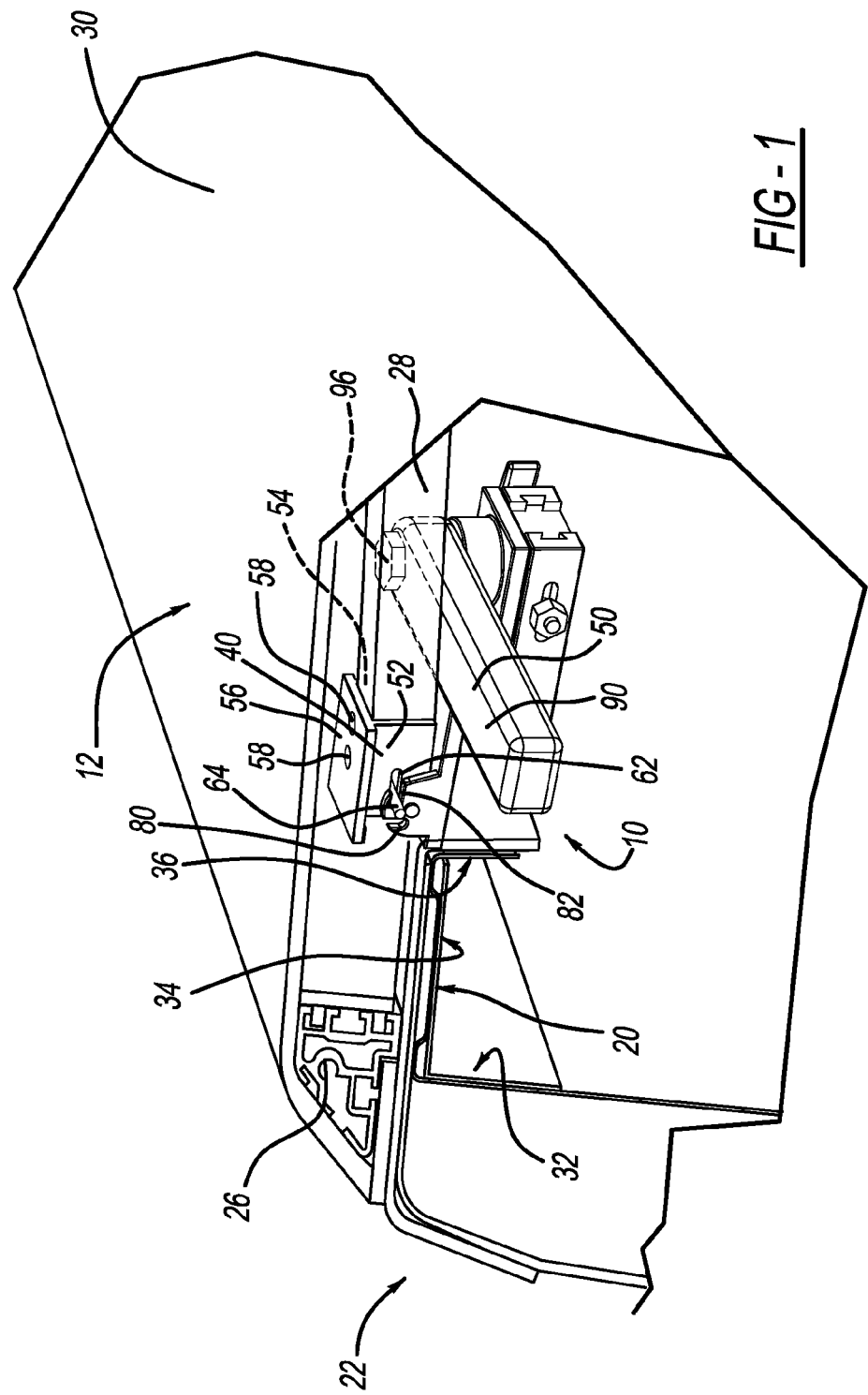
FIG. 1 is a front perspective view of a tonneau cover clamp assembly according to the principles of the present disclosure and shown in a stowed position relative to a rail of a pickup truck bed.

With initial reference to FIGS. 1-5, a tonneau cover clamp constructed in accordance to one example of the present disclosure is shown and generally identified at reference numeral 10. The tonneau cover clamp 10 is configured for use on a tonneau cover 12 for securing the tonneau cover 12 relative to a rail 20 of a motor vehicle 22. The tonneau cover 12 generally includes longitudinal outboard frame members 26 and transverse frame members 28 that cooperate to support a cover portion 30. The rail 20 generally includes an inwardly facing flange 32, a downwardly facing flange 34 and an outwardly facing flange 36. While specific reference and discussion will be made to the tonneau cover clamp 10 positioned generally on a drivers side of the motor vehicle 22, a similar tonneau cover clamp 10 will be provided on the passenger's side of the motor vehicle 22 for cooperating with a similar rail 20. As will become appreciated from the following discussion, the tonneau cover clamp 10 provides a simple and repeatable configuration for securing the tonneau cover 12 relative to the rail 20 of the motor vehicle 22. The tonneau cover clamp 10 provides concurrent downward and outward (cross-vehicle) forces onto the tonneau cover 12 relative to the rail 20 to provide a tight and secure clamped relationship between the tonneau cover clamp 10 and the rail 20 of the motor vehicle 22.

With continued reference now to FIGS. 1-5, additional features of the tonneau cover clamp 10 will be described in greater detail. The tonneau cover clamp 10 generally includes a bracket 40, a clamp arm 44, a clamp member 48 and a handle 50. The bracket 40 generally includes opposing frame members 52 and 54 and a connecting frame member 56. The connecting frame member 56 defines passages 58 configured to receive fasteners (not specifically shown) that fixedly couple the bracket 40 relative to the transverse frame members 28. The frame member 52 defines a bracket slot 62 that receives a pin 64 therein.

Figure 2:
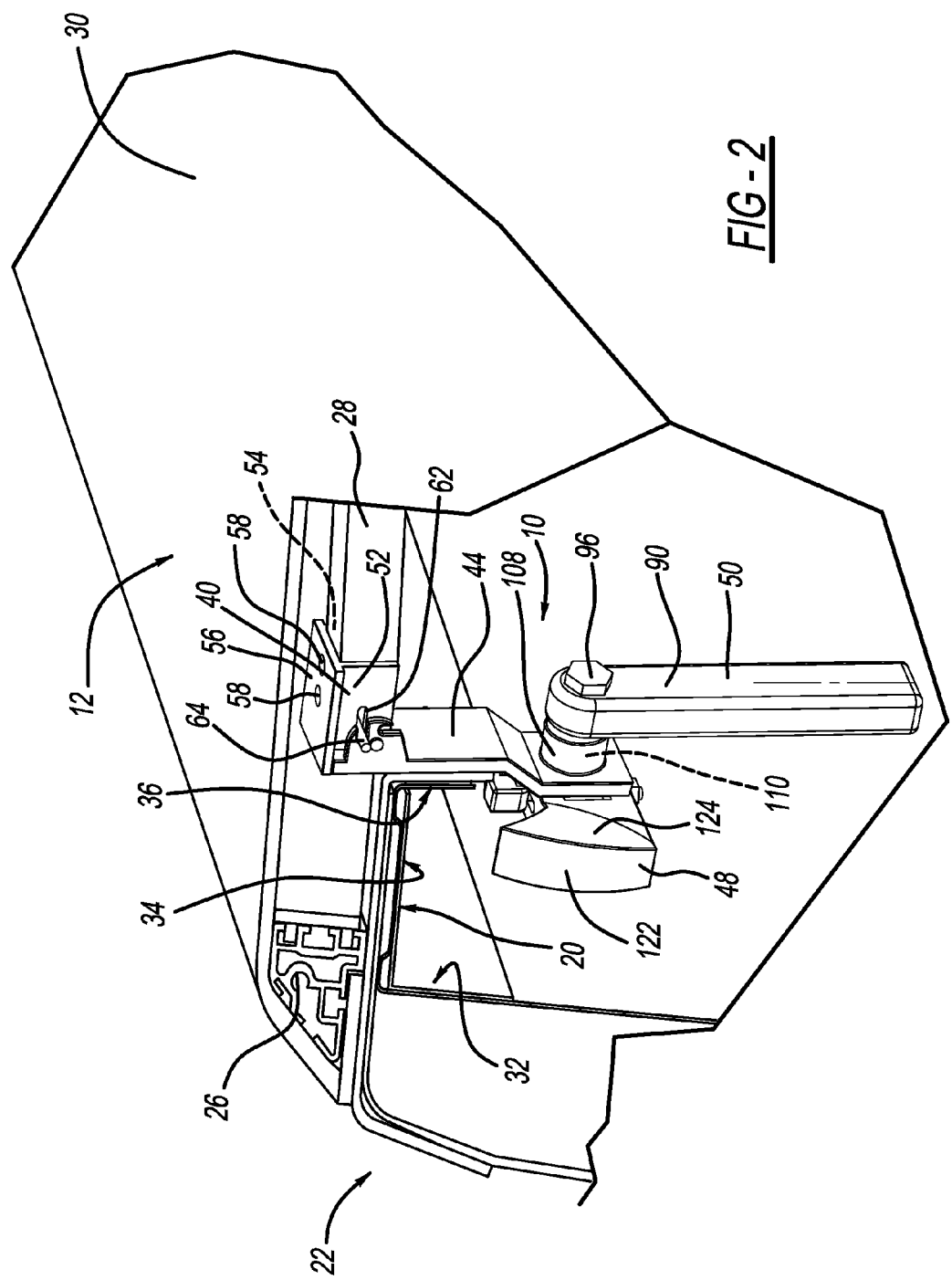
FIG. 2 is a front perspective view of the tonneau cover clamp assembly according to the principles of the present disclosure and shown in an intermediate position relative to a rail of a pickup truck bed.
Figure 3:
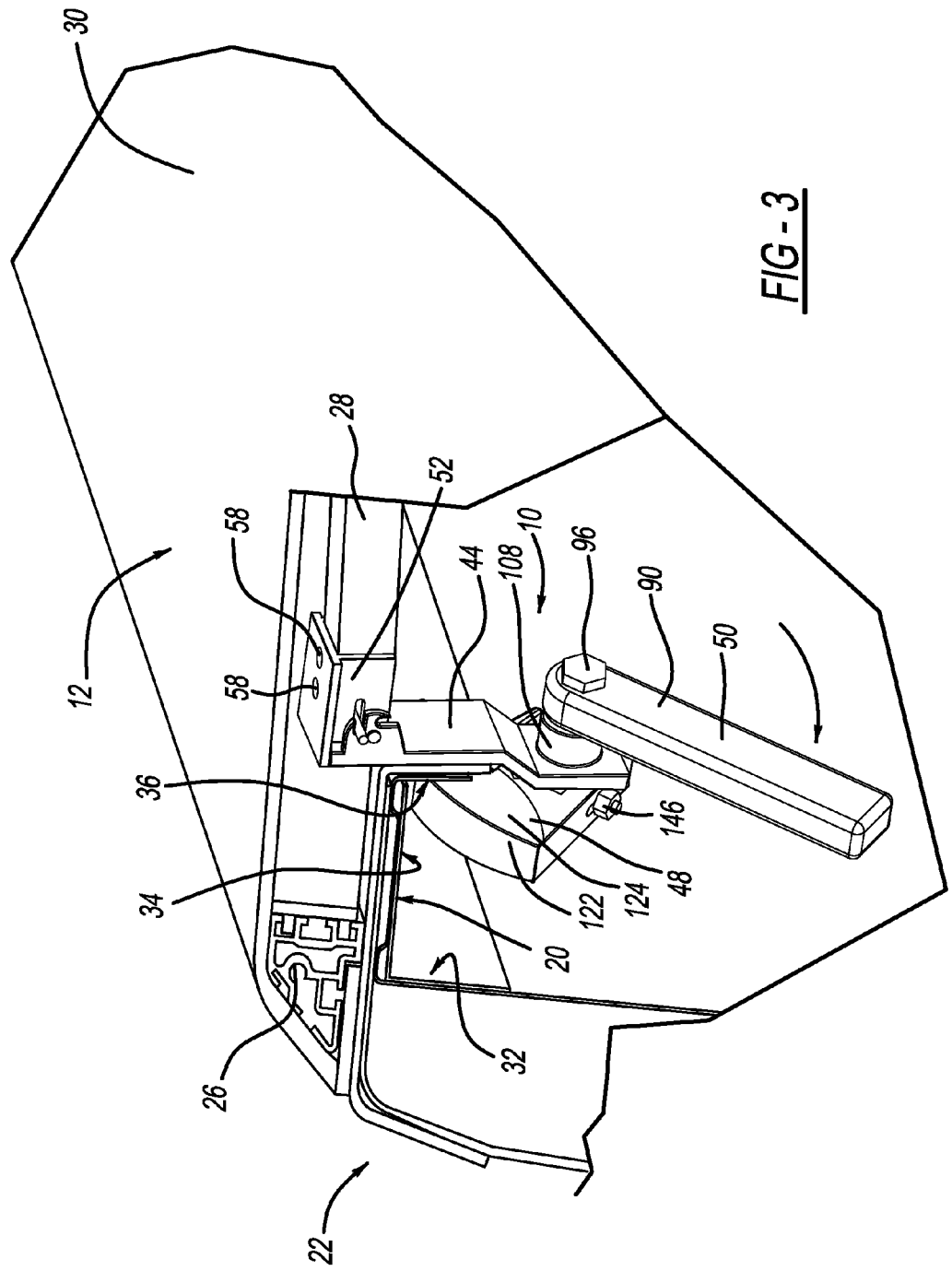
FIG. 3 is a front perspective view of the tonneau cover clamp assembly according to the principles of the present disclosure and shown moving toward a clamped position.
Figure 4:
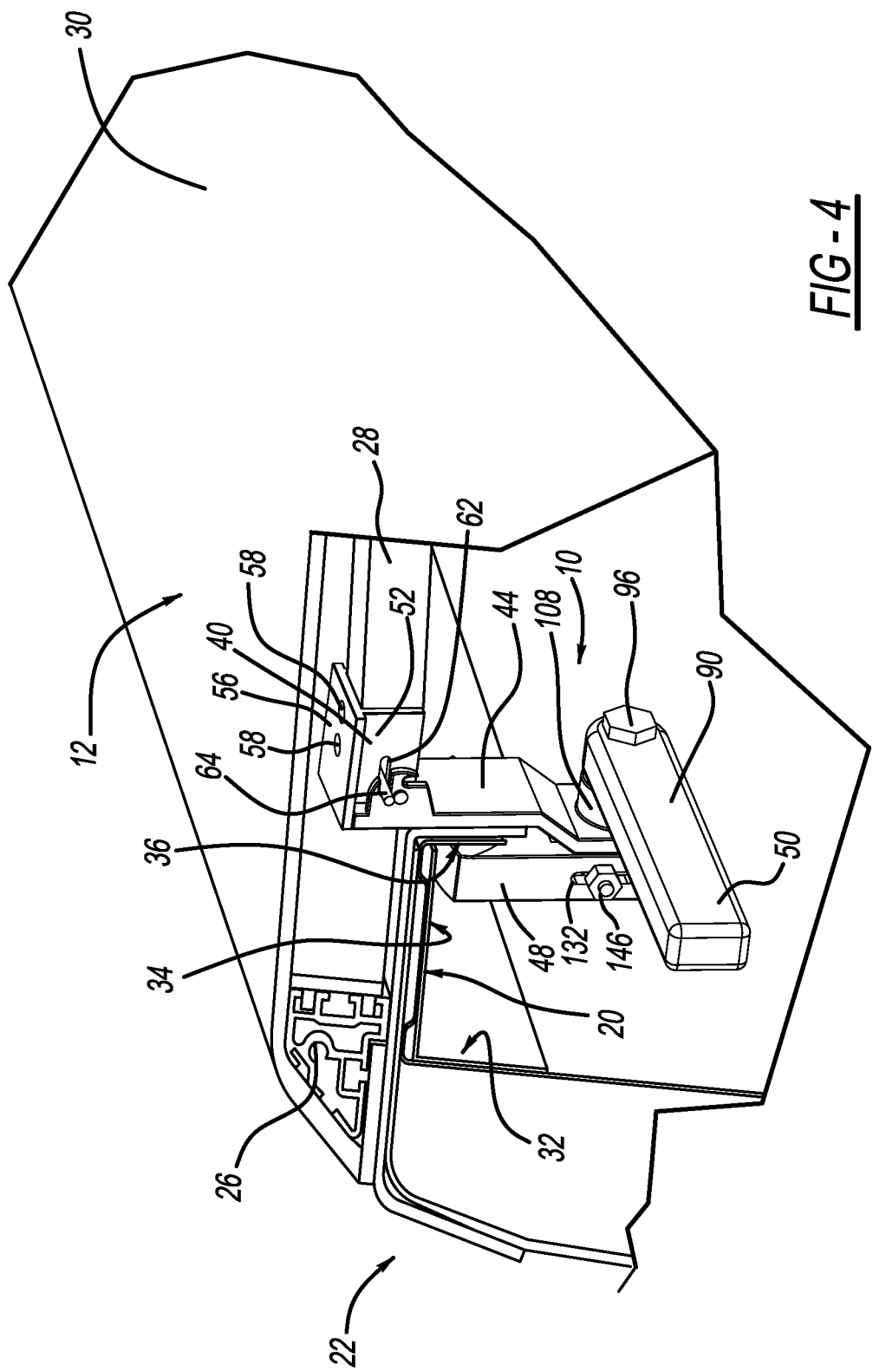
FIG. 4 is a front perspective view of the tonneau cover clamp assembly according to the principles of the present disclosure and shown in a clamped position.
Figure 5:
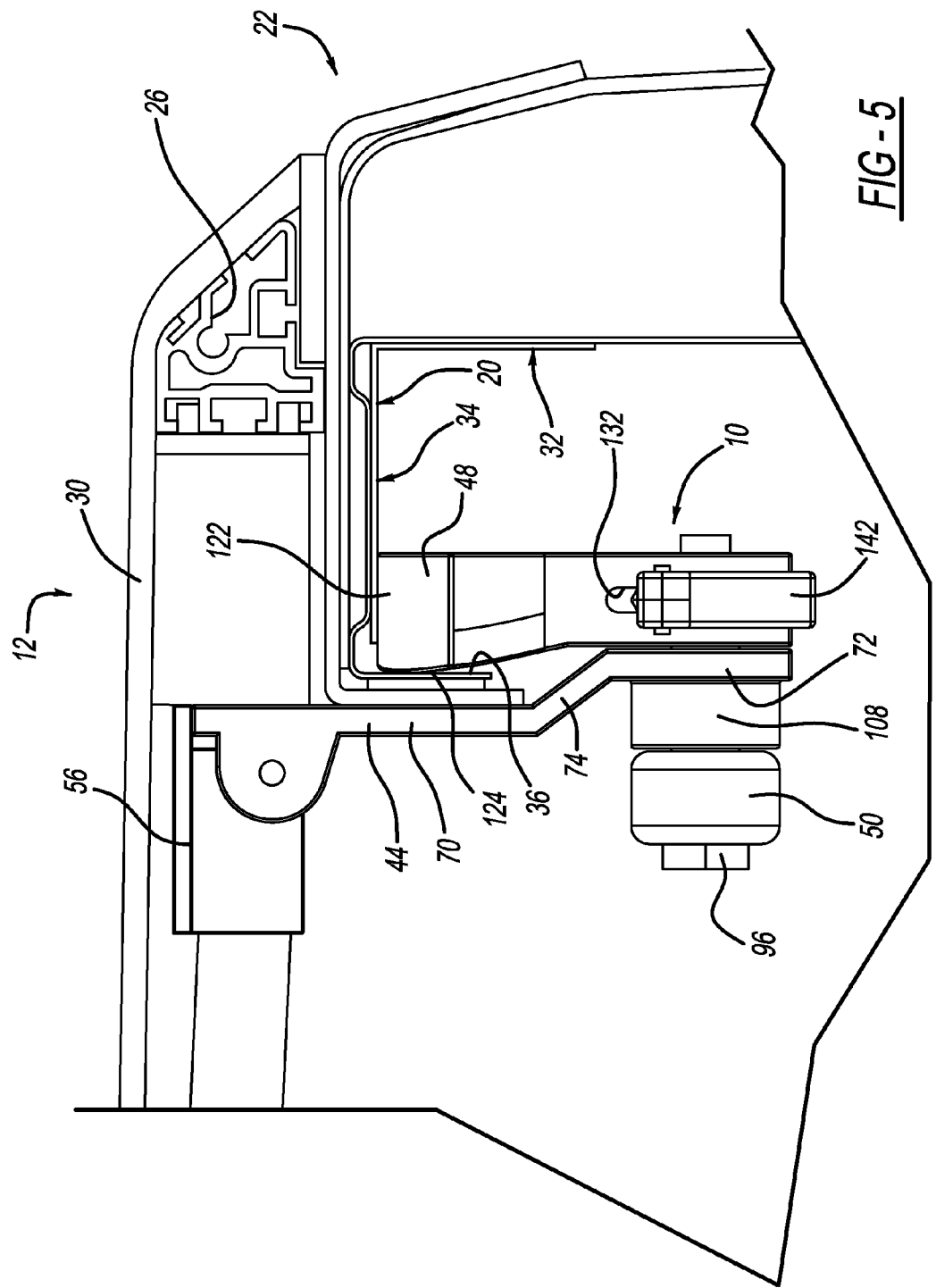
FIG. 5 is a rear perspective view of the tonneau cover clamp assembly according to the principles of the present disclosure and shown in the clamped position.
Figure 6:
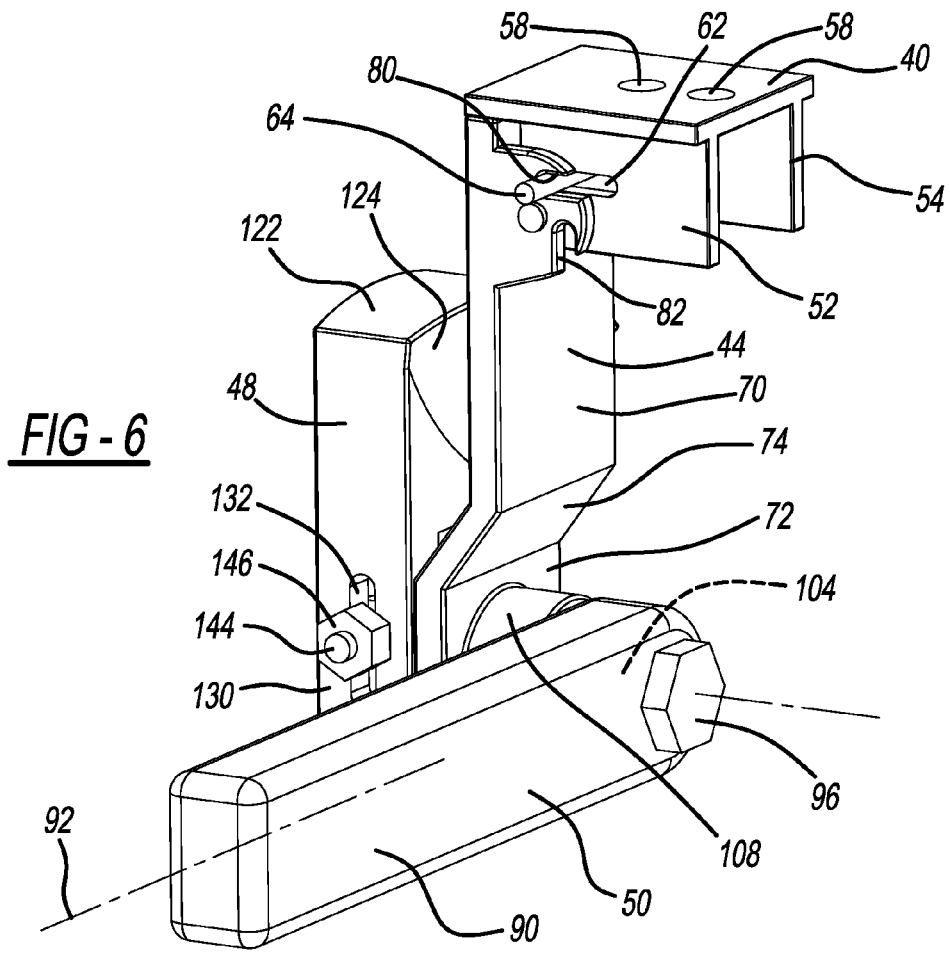
FIG. 6 is a front perspective view of the tonneau cover clamp assembly of FIG. 1 according to the principles of the present disclosure.

With additional reference now to FIG. 6, the clamp arm 44 includes an upper clamp arm portion 70, a lower clamp arm portion 72 and an intermediate clamp arm portion 74. The intermediate clamp arm portion 74 connects the upper clamp arm portion 70 with the lower clamp arm portion 72. The upper clamp arm portion 70 and the lower clamp arm portion 72 define respective planes that are parallel and offset relative to each other. As will become appreciated herein, the intermediate portion 74 provides an angled connection structure that allows the handle 50 to occupy a position generally against or proximate to the transverse frame member 28 in the stowed position (FIG. 1). The clamp arm 44 defines a clamp or working slot 80 and a stowed slot 82 that are configured to alternately receive the pin 64. The pin 64 is configured to move along the bracket slot 62 when moving the clamp arm 44 between the stowed position (FIG. 1) and the working position (FIGS. 2-4). In one example, the pin 64 is biased in a direction generally toward the clamp arm 44 to urge the pin 64 into the respective working slot 80 in the working position or the stowed slot 82 in the stowed position. It will further be appreciated that other mechanical arrangements may be provided for selectively locking the clamp arm 44 relative to the bracket 40 between the working position (FIG. 2) and the stowed position (FIG. 1).

Figure 7:
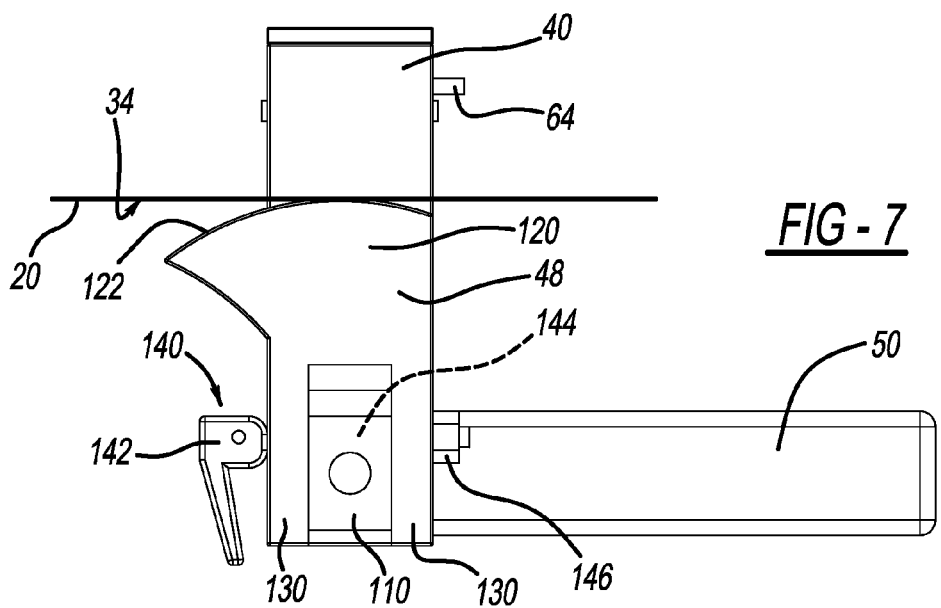
FIG. 7 is a side view of the tonneau cover clamp of FIG. 6 and shown with an upward cam configured on a clamp member engaging a rail of the pickup truck bed.
Figure 8:
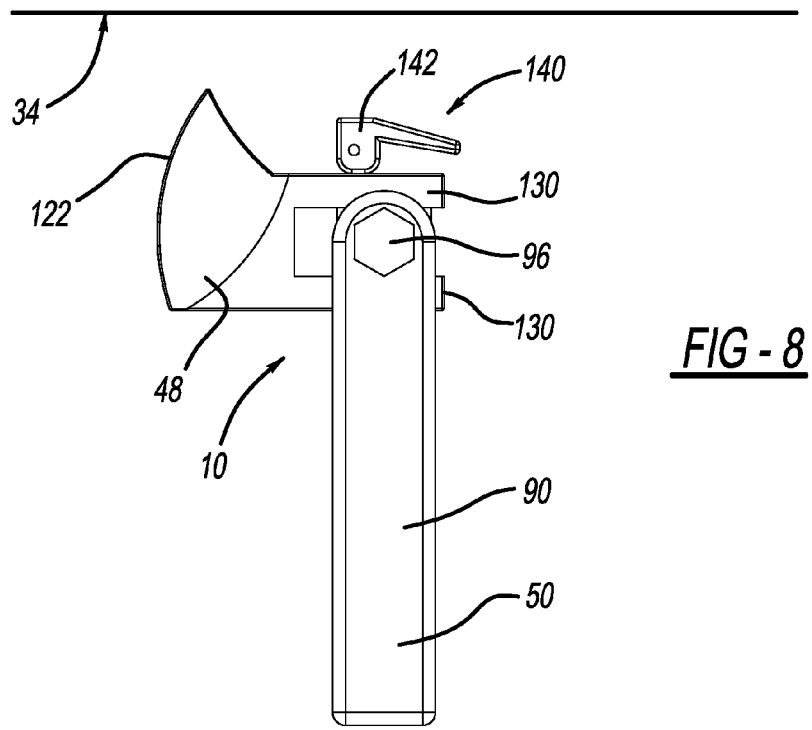
FIG. 8 is a side view of the tonneau cover clamp of FIG. 6 shown in the intermediate position according to the principles of the present disclosure.
Figure 9:
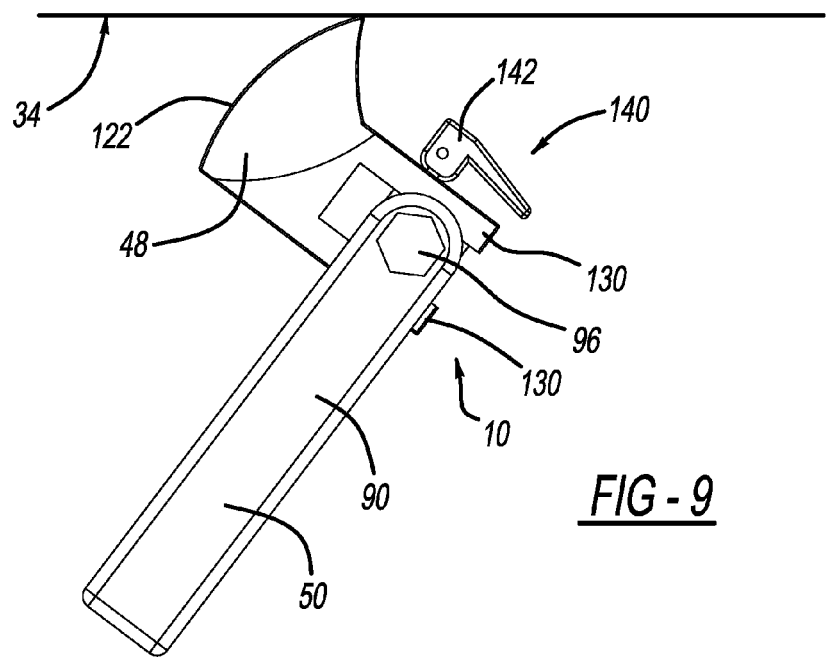
FIG. 9 is a side view of the tonneau cover clamp of FIG. 8 shown moving toward the clamped position according to the principles of the present disclosure.
Figure 10:
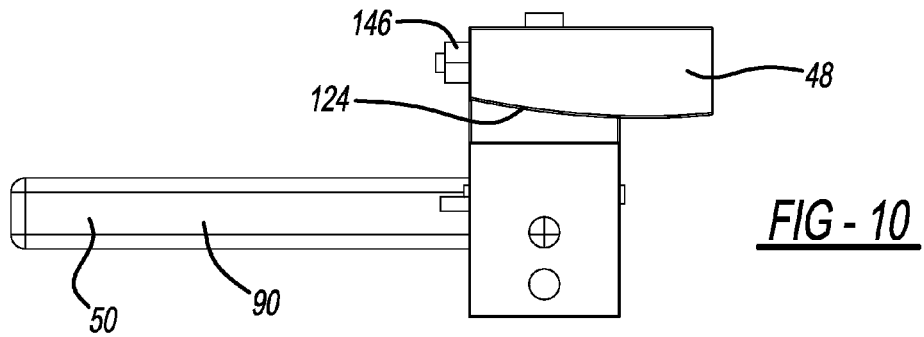
FIG. 10 is a top view of the tonneau cover clamp of FIG. 6 according to the principles of the present disclosure.

The handle 50 generally includes a handle body 90 that defines a longitudinal axis 92 (FIG. 6). The handle 50 is rotatably mounted together with the clamp member 48 relative to the clamp arm 44 about a fastener 96. The fastener 96 extends through an opening 104 defined through the handle 50 and a washer 108. The fastener 96 extends into a receiving member 110 (FIG. 7) captured by the clamp member 48. In the example shown, a distal end of the fastener 96 is threadably coupled to the receiving member 110. Other configurations are contemplated.

The clamp member 48 will now be described in greater detail. The clamp member 48 generally includes a clamp body 120 having an upward cam 122 and a side cam 124 (see for example FIGS. 2 and 5). The clamp body 120 additionally includes a pair of fingers 130 (FIG. 7) that generally extend around the receiving member 110. The fingers 130 define an adjustment slot 132 (FIG. 6) that receives a lock arm assembly 140. The lock arm assembly 140 generally includes a lock arm 142, a threaded shaft 144 and a nut 146. As will be described herein, the lock arm assembly 140 allows the clamp member 48 to be adjustably positioned in the vertical direction as viewed in FIGS. 5 and 7 to adjust the location of the upward cam 122 relative to the rail 20.

Operation of the tonneau cover clamp 10 according to the present disclosure will now be described. With initial reference to FIG. 1, the tonneau cover clamp 10 is shown in a stowed position. In the stowed position, the clamp arm 44 is rotated to a generally laterally offset position relative to the transverse frame member 28. While the handle 50 is shown generally transverse to the transverse frame members 28, the handle 50 may also be rotated to a position generally parallel to the transverse frame member 28. In this regard, the pin 64 is positioned into the stowed slot 82 of the clamp arm 44. As shown in FIG. 2, the tonneau cover clamp 10 is rotated into a working position. In one example, the pin 64 is slidably moved along the slot 62 on the bracket 40 out of the stowed slot 82. The handle 50 is then rotated downwardly from the position shown in FIG. 1 to the position shown in FIG. 2. The pin 64 is then located into the working slot 80 (See also FIG. 6). Again, a biasing member (not shown) may be provided that urges the pin 64 into the respective working slot 80 and stowed slot 82.

In the working position, the pin 64 is located into the working slot 80 of the clamp arm 44. In FIG. 2, the clamp member 48 and the handle 50 are shown in an intermediate position. Moving now to FIG. 3, the clamp member 48 and the handle 50 are initially rotated around an axis of the fastener 96 from the intermediate position toward the clamped position. Continued rotation of the handle 50 in a general upward direction (clockwise direction as viewed in FIGS. 3 and 4), causes the clamp member 48 and the handle 50 to move into the clamped position shown in FIGS. 4 and 5. In the clamped position, the upward cam 122 and the side cam 124 concurrently slidably engage the downwardly facing flange 34 and the outwardly facing flange 36, respectively of the rail 20. As a result, concurrent downward force and outward (cross-vehicle) force is applied to the tonneau cover 12 during movement of the handle 50 and clamp member 48 from the intermediate position to the clamped position.

Figure 11:
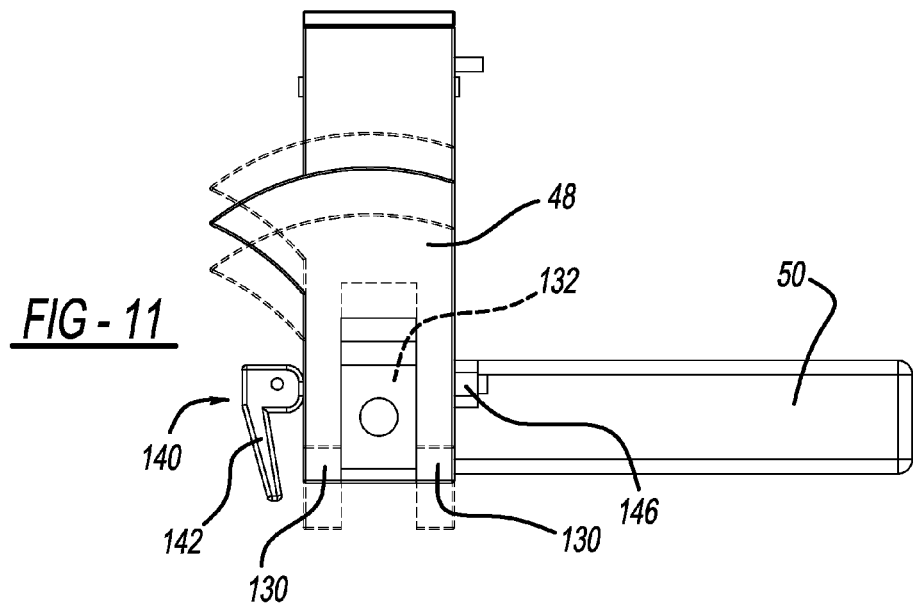
FIG. 11 is a side view of the tonneau cover clamp of FIG. 6 and shown with the clamp member moved along an adjustment slot according to one example of the present disclosure.
Figure 12:
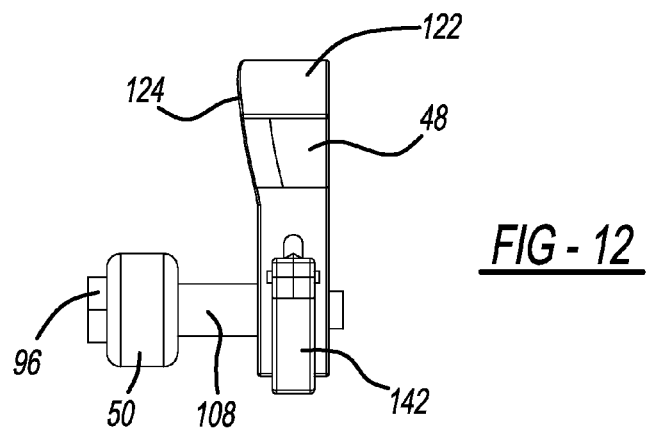
FIG. 12 is a rear view of the tonneau cover clamp of FIG. 6 according to the principles of the present disclosure.

With particular reference now to FIG. 11, operation of the lock arm assembly 140 will now be described. The lock arm assembly 140 allows the clamp member 48 to be adjusted relative to the receiving member 110. In this regard, the clamp member 48 can be adjusted to a position that provides a desired clamping force onto the downwardly facing flange 34 (FIG. 5) of the rail 20. As can be appreciated, over time, the tonneau cover 12 may adjust such as from temperature changes and general wear from use. In some instances, the clamping force between the clamp member 48 and the rail 20 may become loose or insufficient. The lock arm assembly 140 is provided to eliminate this condition by allowing the user the ability to selectively adjust the tension between the clamp member 48 and the rail 20, as desired. The lock arm 142 is configured as a quick-release lever that may be easily flipped away from the clamp member 48 during adjustment and flipped toward the clamp member 48 (FIG. 7) in a locked position.

It will be appreciated that multiple tonneau cover clamps 10 are provided around the tonneau cover 12 for cooperatively engaging the driver's side rail 20 and a similar passenger's side rail on the motor vehicle 22. In this regard, opposite tonneau cover clamps 10 placed on opposite ends of the cargo bed cooperate to influence outward tension on the cover portion 30 during engagement of the respective side cams 124 along the outwardly facing flanges 36. Similarly, each upward cam 122 cooperates to influence downward tension on the cover portion 30 during engagement of the respective upward cams 122 along the downwardly facing flanges 34. The operation of the tonneau cover clamp 10 is simple and repeatable.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A tonneau cover clamp for securing a tonneau cover relative to a rail of a vehicle, the rail having a downwardly facing flange and an outwardly facing flange, the tonneau cover clamp comprising:
   a bracket coupled to a transverse frame member of the tonneau cover;
   a clamp arm that is pivotally coupled to the bracket; and
   a handle and clamp member that are collectively rotatably coupled to the clamp arm, the handle and clamp member collectively rotatable between an intermediate position and a clamped position, the clamp member having an upward cam and a side cam integrally formed thereon, wherein the clamp member is configured to engage the rail upon rotation of the handle such that concurrently (i) the upward cam slidably engages the downwardly facing flange to urge the tonneau cover downwardly and (ii) the side cam slidably engages the outwardly facing flange to urge the tonneau cover outwardly.

2. The tonneau cover clamp of claim 1, wherein the clamp member and the handle are rotatably mounted to a fastener extending through a passage defined in the clamp arm.

3. The tonneau cover clamp of claim 2, wherein the clamp member defines an adjustment slot therein, and wherein the clamp member is selectively movable along the adjustment slot relative to a lock arm to change a location of the upward cam in the clamped position.

4. The tonneau cover clamp of claim 1, wherein the handle includes a handle body having a longitudinal axis that is transverse to the downwardly facing flange in the intermediate position.

5. The tonneau cover clamp of claim 4, wherein the longitudinal axis of the handle body is parallel to the downwardly facing flange in the clamped position.

6. The tonneau cover clamp of claim 1, wherein the clamp arm has an upper clamp arm portion, a lower clamp arm portion and an intermediate clamp arm portion that connects the upper and lower clamp arm portions, and wherein the upper and lower clamp arms define parallel and offset planes.

7. The tonneau cover clamp of claim 1, wherein the clamp arm includes a stowed slot and a clamp slot, and wherein a pin locates (i) into the stowed slot to fix the clamp arm relative to the bracket in a stowed position and (ii) into the clamp slot to fix the clamp arm relative to the bracket in the clamped position.

8. The tonneau cover clamp of claim 7, wherein the stowed slot and the clamp slot are generally transverse relative to each other.

9. The tonneau cover clamp of claim 1, wherein the upward cam is arcuately shaped.

10. The tonneau cover clamp of claim 9, wherein the side cam is arcuately shaped.

11. The tonneau cover clamp of claim 10, wherein the clamp member is formed of injection molded plastic.

12. A tonneau cover clamp for securing a tonneau cover relative to a rail of a vehicle, the rail having a downwardly facing flange and an outwardly facing flange, the tonneau cover clamp comprising:
   a bracket coupled to a transverse frame member of the tonneau cover;
   a clamp arm that is rotatably coupled to the bracket between a stowed position and a working position; and
   a handle and clamp member rotatable (i) with the clamp arm relative to the bracket from the stowed position to the working position, and rotatable (ii) relative to the clamp arm between an intermediate position and a clamped position, the clamp member having an upward cam and a side cam integrally formed thereon, wherein the clamp member is configured to engage the rail upon rotation of the handle such that concurrently (i) the upward cam slidably engages the downwardly facing flange to urge the tonneau cover downwardly and (ii) the side cam slidably engages the outwardly facing flange to urge the tonneau cover outwardly.

13. The tonneau cover clamp of claim 12, wherein the clamp member and the handle are rotatably mounted to a fastener extending through a passage defined in the clamp arm.

14. The tonneau cover clamp of claim 13, wherein the clamp member defines an adjustment slot therein, and wherein the clamp member is selectively movable along the adjustment slot relative to a lock arm to change a location of the upward cam in the clamped position.

15. The tonneau cover clamp of claim 12, wherein the handle includes a handle body having a longitudinal axis that is transverse to the downwardly facing flange in the intermediate position.

16. The tonneau cover clamp of claim 15, wherein the longitudinal axis of the handle body is parallel to the downwardly facing flange in the clamped position.

17. The tonneau cover clamp of claim 12, wherein the clamp arm has an upper clamp arm portion, a lower clamp arm portion and an intermediate clamp arm portion that connects the upper and lower clamp arm portions, and wherein the upper and lower clamp arms define parallel and offset planes.

18. The tonneau cover clamp of claim 12, wherein the clamp arm includes a stowed slot and a clamp slot, wherein a pin locates (i) into the stowed slot to fix the clamp arm relative to the bracket in the stowed position and (ii) into the clamp slot to fix the clamp arm relative to the bracket in the working position, and wherein the stowed slot and the clamp slot are generally transverse relative to each other.

\* \* \* \* \*